United States Patent
Winter

(10) Patent No.: US 8,225,176 B2
(45) Date of Patent: Jul. 17, 2012

(54) DETECTION OF DUPLICATE PACKETS

(75) Inventor: Robert Lee Winter, Leander, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 13/329,416

(22) Filed: Dec. 19, 2011

(65) Prior Publication Data

US 2012/0089894 A1    Apr. 12, 2012

Related U.S. Application Data

(63) Continuation of application No. 11/854,787, filed on Sep. 13, 2007, now Pat. No. 8,091,007.

(51) Int. Cl.
*H03M 13/00* (2006.01)

(52) U.S. Cl. .................. 714/758; 714/746; 714/752

(58) Field of Classification Search .................. 714/758, 714/746, 764, 799, 752, 701, 776
See application file for complete search history.

(56) References Cited

U.S. PATENT DOCUMENTS

| | | | |
|---|---|---|---|
| 5,335,325 A * | 8/1994 | Frank et al. ................... | 711/163 |
| 5,495,580 A | 2/1996 | Osman | |
| 5,638,512 A | 6/1997 | Osman et al. | |
| 6,188,694 B1 | 2/2001 | Fine et al. | |
| 6,330,229 B1 | 12/2001 | Jain et al. | |
| 6,628,624 B1 | 9/2003 | Mahajan et al. | |
| 6,678,854 B1 | 1/2004 | Irvin | |
| 7,366,961 B1 * | 4/2008 | Kovacevic et al. ............ | 714/701 |
| 7,525,958 B2 | 4/2009 | Kumar et al. | |

* cited by examiner

*Primary Examiner* — Fritz Alphonse
(74) *Attorney, Agent, or Firm* — Haynes and Boone, LLP

(57) ABSTRACT

A packet is received from a network. The packet includes a field. The content of the field is compared to each element of a list. If the content of the field fails to match any element in the list, the packet is accepted and the content of the field is added to the list as an additional element of the list.

20 Claims, 7 Drawing Sheets

| CRC | uSec | DADDR | SADDR | TYPE | DATA |
|---|---|---|---|---|---|
| 1234 | 220 | A54653 | 654987 | 12 | 123...ABC |
| 4567 | 221 | 112356 | 987B65 | 12 | 432...4AA |
| ⋮ | | | | | |
| A45B | 289 | BD34AF | 65AD65 | 12 | EE1...456 |
| C6DA | 234 | BDFA12 | 77ACE1 | 12 | 1A3...569 |
| F864 | 215 | 3A2197 | 123456 | 12 | 023...450 |

Fig. 7

| CRC | uSec | DADDR | SADDR | TYPE | DATA |
|---|---|---|---|---|---|
| 1234 | 220 | A54653 | 654987 | 12 | 123...ABC |
| 4567 | 221 | 112356 | 987B65 | 12 | 432...4AA |
| ⋮ | ⋮ | ⋮ | ⋮ | ⋮ | ⋮ |
| A45B | 289 | BD34AF | 65AD65 | 12 | EE1...456 |
| C6DA | 234 | BDFA12 | 77ACE1 | 12 | 1A3...569 |
| F864 | 215 | 3A2197 | 123456 | 12 | 023...450 |
| (FA64) | 185 | 8A5179 | 6FAD6F | 12 | F23...4F1 |

Fig. 9

| CRC | uSec | DADDR | SADDR | TYPE | DATA |
|---|---|---|---|---|---|
| 1234 | 220 | A54653 | 654987 | 12 | 123...ABC |
| 4567 | 221 | 112356 | 987B65 | 12 | 432...4AA |
| ⋮ | ⋮ | ⋮ | ⋮ | ⋮ | ⋮ |
| A45B | 289 | BD34AF | 65AD65 | 12 | EE1...456 |
| C6DA | 234 | BDFA12 | 77ACE1 | 12 | 1A3...569 |
| F864 | 215 | 3A2197 | 123456 | 12 | 023...450 |
| FA64 | 185 | 8A5179 | 6FAD6F | 12 | F23...4F1 |

DETECTION OF DUPLICATE PACKETS

CROSS REFERENCE TO RELATED APPLICATIONS

The present application claims priority to and is a continuation of co-owned, U.S. patent application Ser. No. 11/854,787 filed Sept. 13, 2007, now U.S. Pat. No. 8,091,007 issued on Jan. 3, 2012, the disclosure of which is incorporated herein by reference.

BACKGROUND

The present disclosure relates generally to information handling systems, and more particularly to detecting duplicate packets in networking systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information. Furthermore, IHSs may include several devices coupled together to form a network for the purpose of sharing data, resources and communication. Traditionally, the network will have a plurality of nodes, and paths will be formed between the nodes. The use of such a network raises a number of issues.

Conventionally, packets can be sent along the paths from node to node. Multiple paths between two nodes can cause duplicate packets to be sent. This can consume a lot of the network's bandwidth. Traditionally, the Spanning Tree Protocol (STP), as defined in the IEEE Standard 802.1D, is used to eliminate the sending of duplicate packets by disabling redundant paths between nodes resulting in only a single operational path between any two nodes. The disabling of the redundant paths reduces the bandwidth capacity of the network.

Accordingly, it would be desirable to provide an improved networking system.

SUMMARY

According to one embodiment, a packet is received from a network, wherein the packet includes a field. The content of the field is compared to each element of a list, and if the content of the field fails to match any element in the list, the packet is accepted and the content of the field is added to the list as an additional element of the list.

BRIEF DESCRIPTION OF THE DRAWINGS

FIG. 7 illustrates the list of FIG. 6 that has been updated to include additional information.

FIG. 9 depicts the list of FIG. 6 that has been updated to include additional information.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
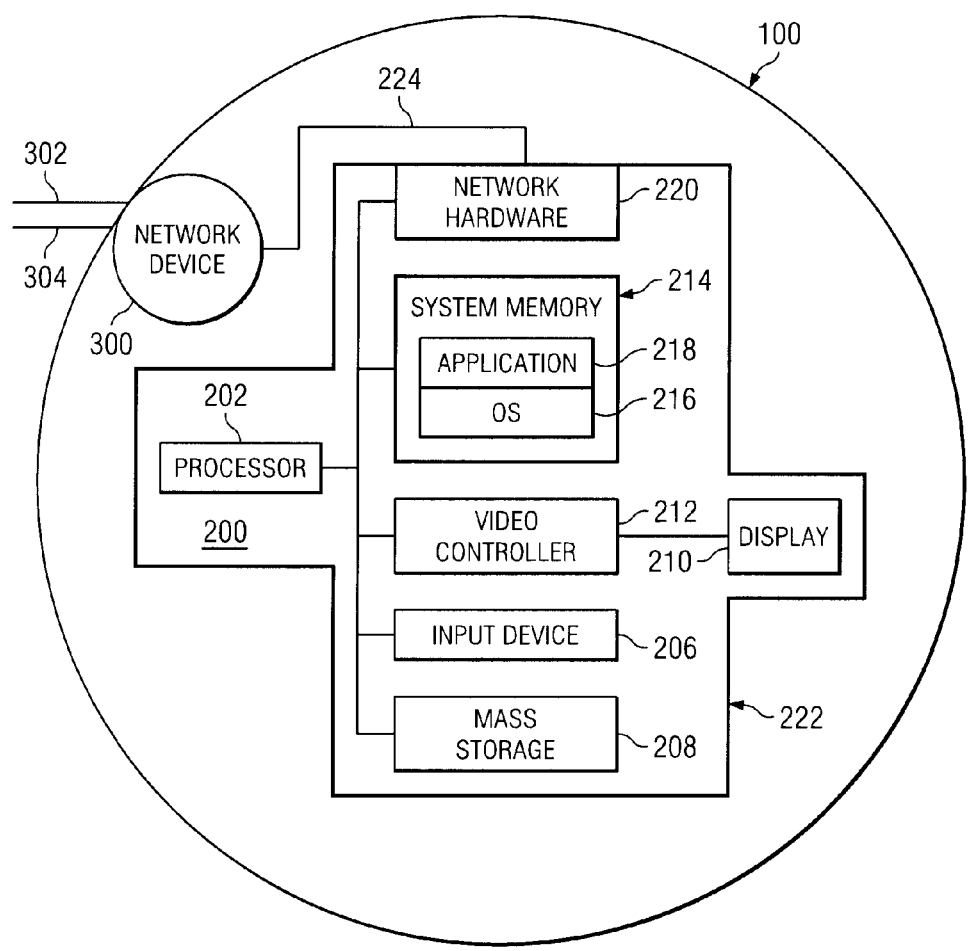
FIG. 1 illustrates an embodiment of a node.

In one embodiment, node 100, FIG. 1, illustrates a an IHS 200 and a network device 300. The IHS 200 includes a processor 202, which is connected to a bus 204. Bus 204 serves as a connection between processor 202 and other components of computer system 200. An input device 206 is coupled to processor 202 to provide input to processor 202. Examples of input devices include keyboards, touchscreens, and pointing devices such as mouses, trackballs and trackpads. Programs and data are stored on a mass storage device 208, which is coupled to processor 202. Mass storage devices include such devices as hard disks, optical disks, magneto-optical drives, floppy drives and the like. IHS 200 further includes a display 210, which is coupled to processor 202 by a video controller 212. A system memory 214 is coupled to processor 202 to provide the processor with fast storage to facilitate execution of computer programs by processor 202. The system memory 214 includes an operating system 216 and an application program 218. Network hardware 220 is coupled to the processor 202 to serve as an interface between the IHS 200 and a computer network. Network hardware 220 includes network cards, network adapters, network interface cards, and the like. In an embodiment, a chassis 222 houses some or all of the components of IHS 200. It should be understood that other buses and intermediate circuits can be deployed between the components described above and processor 202 to facilitate interconnection between the components and the processor 202. The IHS 200 is coupled to a network device 300 by an Ethernet cable 224 to enable the IHS 200 to communicate with other IHSs over the computer network. Network devices include repeaters, hubs, bridges, switches, routers, and the like. The node 100 is coupled to the computer network through network device 300 using Ethernet cables 302 and 304.

Figure 2:
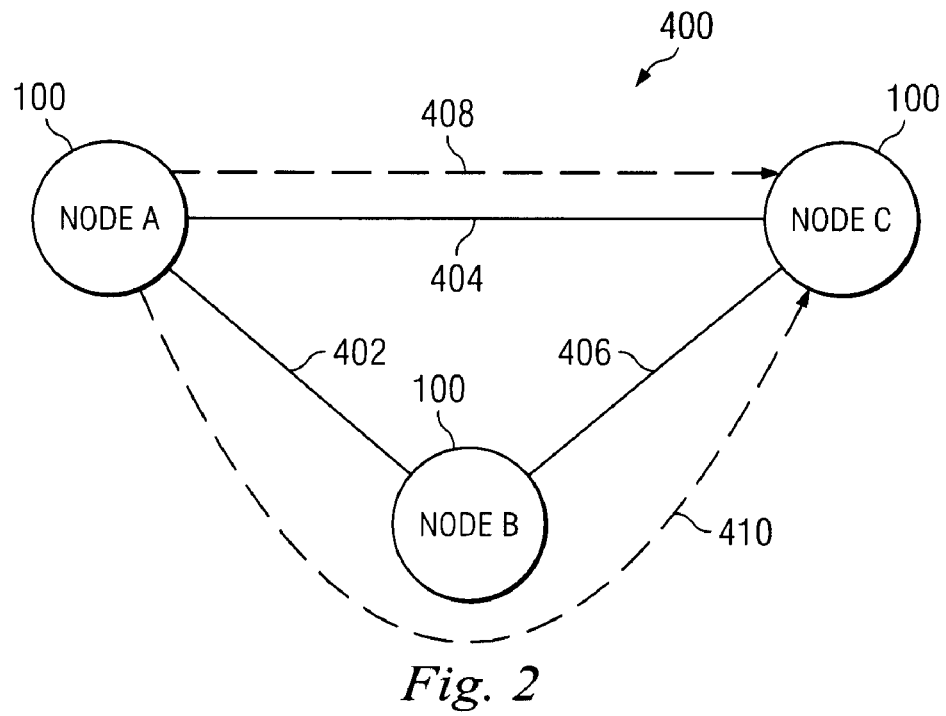
FIG. 2 depicts an embodiment of a computer network including the node of FIG. 1.

Referring now to FIG. 2, an embodiment of a computer network 400 is illustrated. In an embodiment, the computer network 400 is a local area network (LAN). The computer network 400 includes a node A 100 coupled to a node B 100 by an Ethernet cable 402 and to a node C 100 by an Ethernet cable 404. Ethernet cables 402 and 404 are similar to Ethernet cables 302 and 304, illustrated in FIG. 1. The node B 100 is coupled to the node C 100 by an Ethernet cable 406. Ethernet cable 406 is similar to Ethernet cables 302 and 304, illustrated in FIG. 1. As can be seen, a packet traveling from node A 100 to node C 100 may be sent along path 408 directly from node A 100 through the Ethernet cable 404 to node C 100 and/or along path 410 from node A 100 through the Ethernet cable 402 to node B 100 and then through the Ethernet cable 406 from node B 100 to node C 100. This may result in node C 100 receiving duplicate packets.

Figure 3:
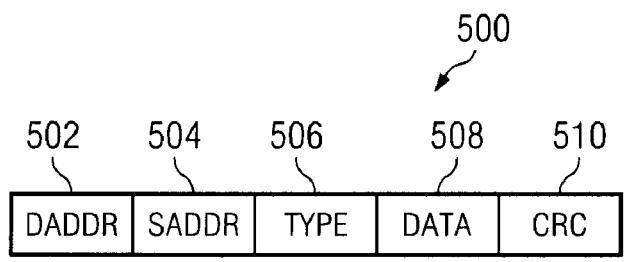
FIG. 3 illustrates an embodiment of a frame format for transmitting a packet over the computer network of FIG. 2.
Figure 4:
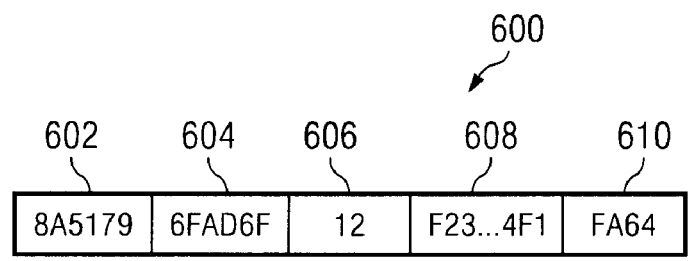
FIG. 4 depicts an embodiment of a packet formatted according to the frame format of FIG. 3.

Referring now to FIGS. 3 and 4, an embodiment of a network frame 500 and a packet 600 are illustrated. Network frame 500 includes a DADDR field 502, an SADDR field 504, a TYPE field 506, a DATA field 508, and a CRC field 510. A packet 600 sent using the network frame 500 will include a destination address 602 in the DADDR field 502, a source address 604 in the source address field, a type 606 in the TYPE field 506, data 608 in the DATA field 608, and a cyclic redundancy check (CRC) 610 in the CRC field 510. The destination address 602 indicates a node designated to receive the packet 600. The source address 604 indicates a node transmitting the packet 600. The type 606 indicates a type of the packet 600 being transmitted. The data field 608 includes data being sent in the packet 600. The content stored in the CRC field 510 is a first CRC value that that is calculated and sent by a transmitting node. The content stored in the CRC field 510 is compared to a second CRC value that is calculated at a receiving node. If the first CRC value matches the second CRC value, the receiving node will deem the packet 600 to be error free. Any plurality of information included in the fields 602-608 may be deemed a portion of the packet 600 other than the CRC 610.

Figures 5, 6:
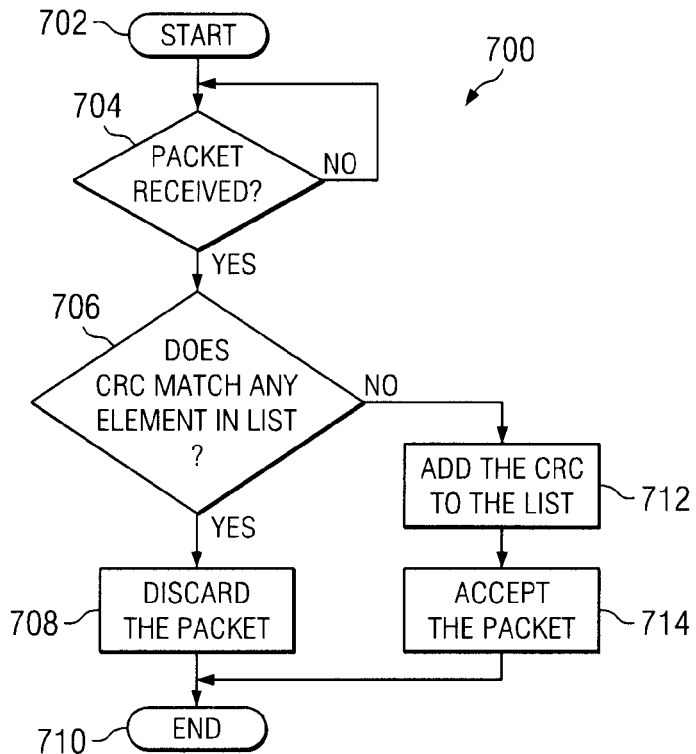
FIG. 5 illustrates an embodiment of a method to detect duplicate packets.
FIG. 6 shows an embodiment of a list used in the method of FIG. 5.

Referring now to FIG. 5, an embodiment of a method 700 to detect duplicate packets is illustrated. The method 700 begins at block 702 and proceeds to decision block 704 where it is determined by node C 100 whether a packet has been received from a network through Ethernet cable 404 or Ethernet cable 406. In an embodiment the packet is the packet 600, illustrated in FIG. 4. If it is determined at decision block 704 that the packet 600 has not been received, the method 700 returns to decision block 704. If it is determined at decision block 704 that the packet 600 has been received, the method 700 then proceeds to decision block 706.

At decision block 706, it is determined whether the CRC 610 matches any element in a list. Referring now to FIG. 6, an embodiment of a list 800 is illustrated. The list 800 includes a CRC column 802, a uSec column 804, a DADDR column 806, an SADDR column 808, a TYPE column 810, and a DATA column 812. The list 800 further includes elements 814. Each of the elements 814 in the CRC column is associated with a time value 816 in the uSec column 804. Each of the elements 814 in the CRC column may be associated with additional elements as respective further information 818 in the columns 806-812. In an embodiment, only the elements 814 in the CRC column 802 are compared to the CRC 610. Although six columns are illustrated in the list 800, in another embodiment, the list 800 may include only one column. In yet another embodiment, the list 800 may include any plurality of columns. If it is determined at decision block 706 that the CRC 610 matches any of the elements 814 in the CRC column 802, then the method 700 proceeds to decision block 708 where the packet 600 is discarded. The method 700 then ends at block 710.

If it is determined at decision block 706 that the CRC 610 does not match one of the elements 814 in the CRC column 802, the method 700 then proceeds to block 712 where the CRC 610 is added to the list 800 in the CRC column 802 as an additional element of the list 800. Referring now to FIG. 7, the list 800 is modified to include additional element 814 to show that the CRC 610 has been added to the list 800 as an additional element. As can be seen, additional information may also be added to the list 800 and associated with the additional element 814. The method 700 then proceeds to block 714 where the packet 600 is accepted. If the packet 600 is accepted, information contained in the packet is passed from the OS 216, illustrated in FIG. 1, up to the application program 218, also shown in FIG. 1. The method 700 then ends at step 710.

Figure 8:
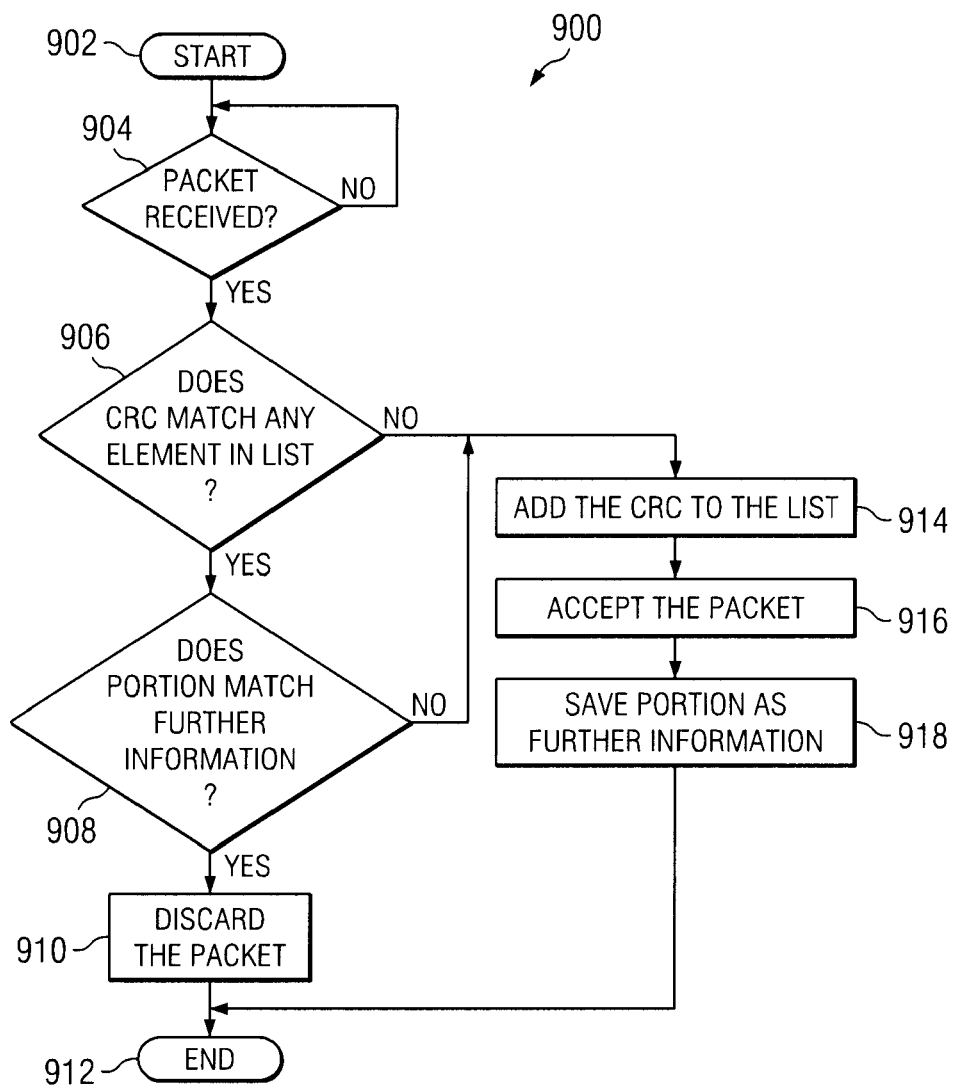
FIG. 8 illustrates an embodiment of another method to detect duplicate packets.

Referring now to FIG. 8, another embodiment of a method to detect duplicate packets is illustrated. The method 900 begins at block 902 and proceeds through decision blocks 904 and 906 in a similar manner as the method 700 proceeds through decision blocks 704 and 706, described above with reference to FIG. 5. If it is determined at decision block 906 that the CRC 610 matches any element in the CRC column 802 of the list 800, the method 900 then proceeds to decision block 908 where it determines whether a portion of the packet 600 other than the CRC 610 matches the further information 818 associated with the matching element. If it is determined at decision block 908 that the portion of the packet 600 matches the further information 818 associated with the matching element, the method 900 then proceeds to block 910 where the packet 600 is discarded. The method 900 then ends at block 912.

If it is determined at decision block 906 that the CRC 610 does not match any element in the CRC column 802 of the list 800 or if it is determined at decision block 908 that the portion of the packet 600 does not match the further information 818 associated with the matching element, the method 900 then proceeds through blocks 914 and 916 in a similar manner as the method 700 proceeds through blocks 712 and 714, described above with reference to FIG. 5. The method 900 then proceeds to block 918 where it saves the portion of the packet 600 as further information associated with the matching element in the list 800, as illustrated in FIG. 9. As can be seen, additional information may also be added to the list 800 and associated with the portion of the packet 600 saved as further information associated with the matching element. The method 900 then ends at block 912.

Figure 10:
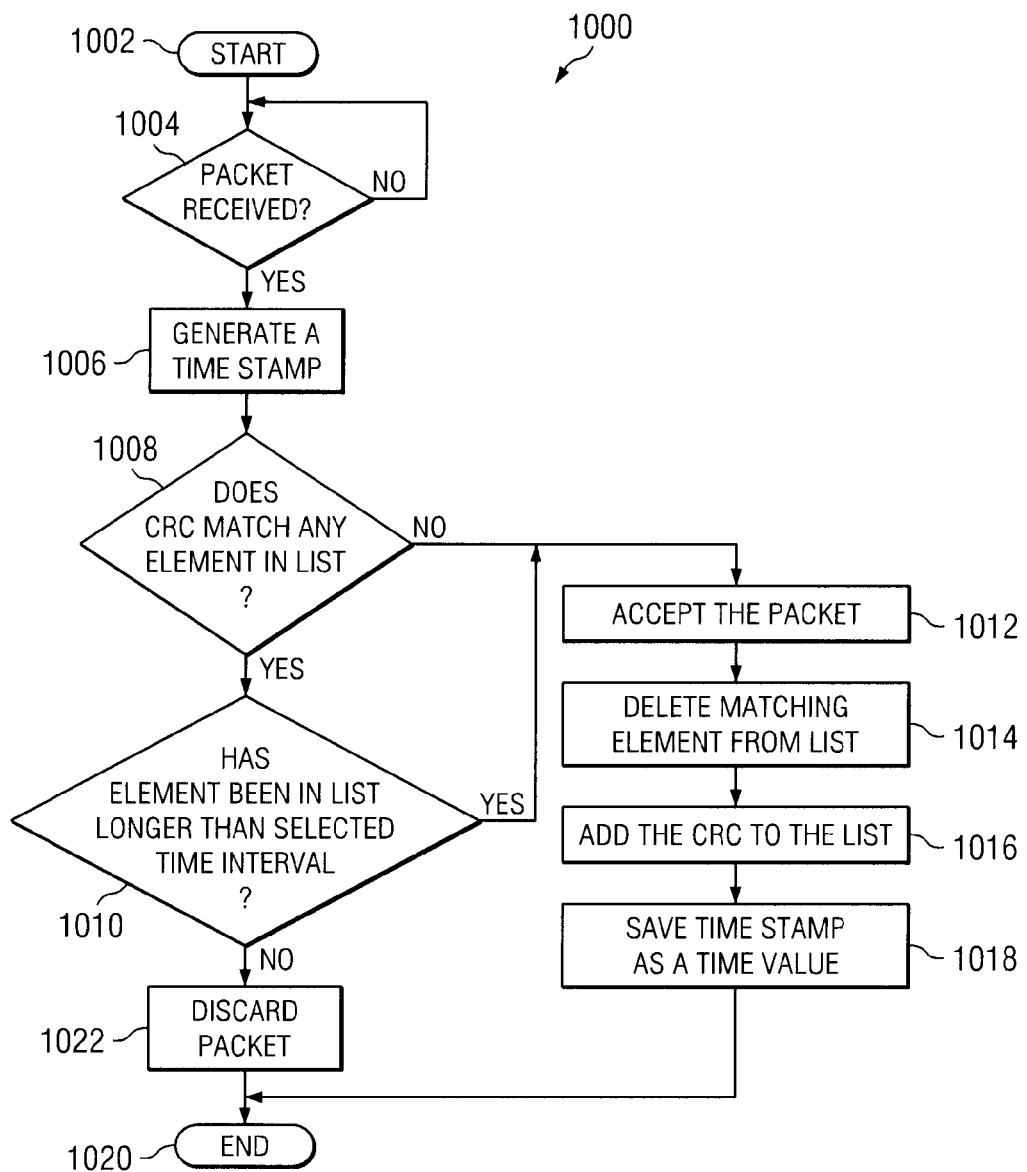
FIG. 10 shows an embodiment of another method to detect duplicate packets.

Referring now to FIG. 10, another embodiment of a method to detect duplicate packets is illustrated. The method 1000 begins at block 1002 and proceeds through decision block 1004 in a similar manner as the method 700 proceeds through decision block 704, described above with reference to FIG. 5, except that if it is determined at decision block 1004 that a packet was received, the method 1000 then proceeds to block 1006 where a time stamp is generated. The method then proceeds through decision block 1008 in a similar manner as the method 700 proceeds through decision block 706, described above with reference to FIG. 5, except that if it is determined that the CRC 610 does match any element in the CRC column 802 of the list 800, the method 1000 then proceeds to decision block 1010 where it is determined whether the matching element has been in the list 800 longer than a selected time interval. The selected time interval may be selected as a time interval where duplicate packets may be expected to arrive at the node 100, illustrated in FIG. 1, and may be measured in microseconds (uSec). The time stamp generated at block 1006 may be used to determine whether the matching element has been in the list 800 longer than the selected time interval by comparing the time stamp with the value in the uSec column 804 of the list 800 associated with the matching element. If it is determined at decision block 1010 that the matching element has been in the list 800 longer than the selected time interval or if it is determined at decision block 1008 that the CRC 610 does not match any element in the CRC column 802 of the list 800, the method 1000 then proceeds through block 1012 in a similar manner as the method 700 proceeds through block 714, described above with reference to FIG. 5.

If it is determined at decision block 1010 that the matching element has not been in the list longer than the selected time interval, the method 1000 then proceeds through block 1022 in a similar manner as the method 700 proceeds through block 708, described above with reference to FIG. 5. The method 1000 then ends at block 1020.

Figure 11:
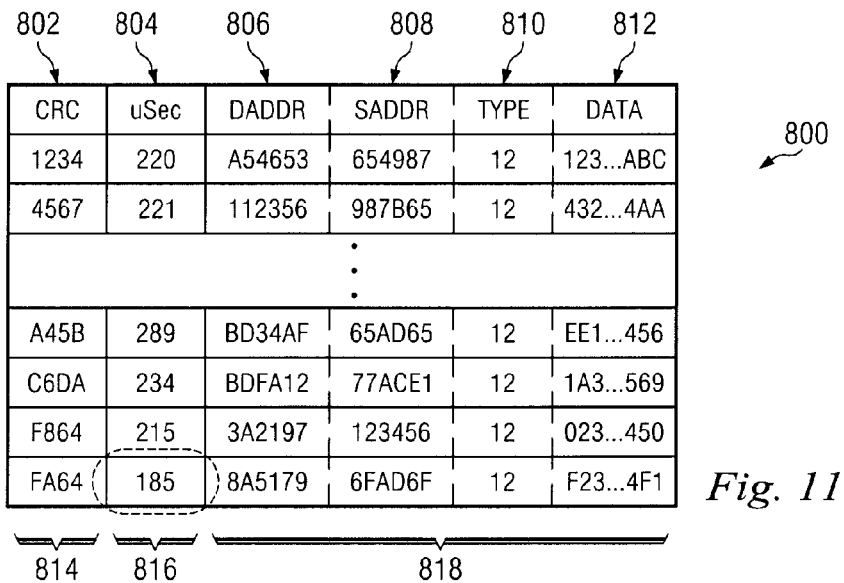
FIG. 11 illustrates the list of FIG. 6 that has been updated to include additional information.

The method 1000 then proceeds to block 1014 where the matching element is deleted from the list 800. The method 1000 then proceeds through block 1016 in a similar manner as the method 700 proceeds through block 712, described above with reference to FIG. 5. The method 1000 then proceeds to block 1018 where the time stamp generated at block 1006 is saved as a respective time value 816 in the uSec column 804 of the list 800, as illustrated in FIG. 11. As can be seen, additional information may also be added to the list 800 and associated with the saved respective time value 816. The method 1000 then ends at block 1020.

Figure 12:
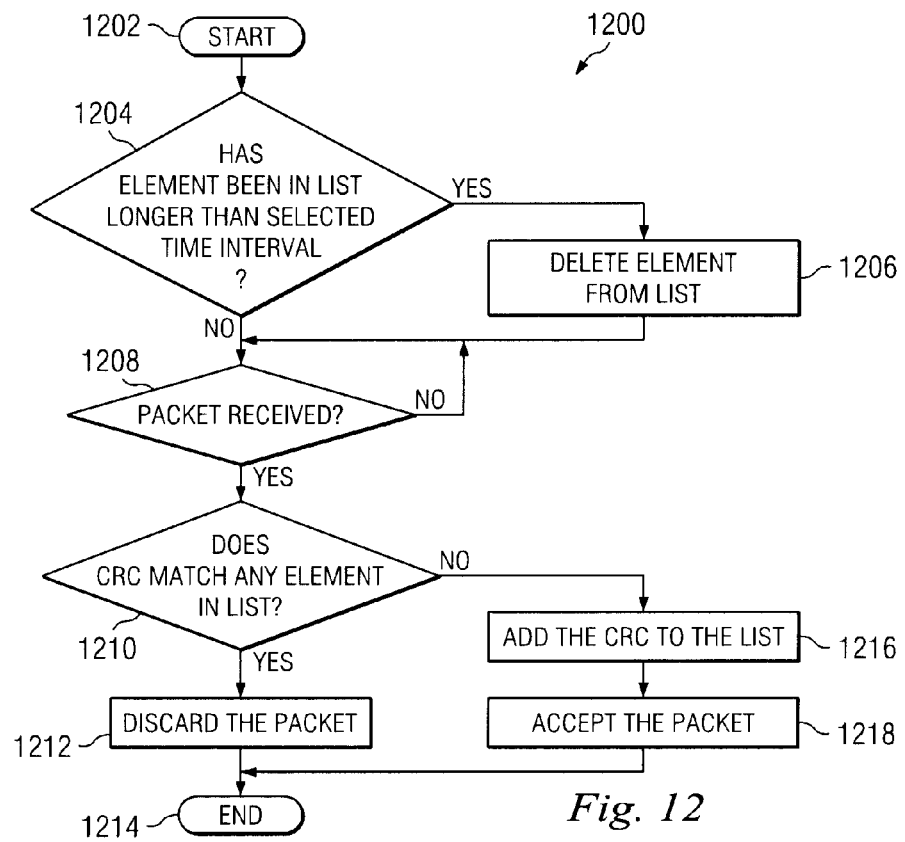
FIG. 12 illustrates an embodiment of another method to detect duplicate packets.

Referring now to FIG. 12, another embodiment of a method to detect duplicate packets is illustrated. The method 1200 begins at block 1202 and proceeds to decision block 1204 where it is determined whether any of the elements 814 have been in the list 800 longer than the selected time interval. To determine whether each element 814 has been in the list 800 longer than the selected time interval, the value in the uSec column 804 associated with each of the elements 814 may be compared to a current time stamp. If it is determined that any of the elements 814 have been in the list longer than the selected time interval, the elements are deemed to be stale. The method 1200 then proceeds to block 1206 where the stale elements are deleted from the list 800.

If it is determined at decision block 1204 that none of the elements 814 have been in the list 800 longer than the predefined time interval or following block 1206, the method 1200 then proceeds through decision block 1208 in a similar manner as the method 700 proceeds through block 704, described above with reference to FIG. 5. The method 1200 then proceeds through decision block 1210 and blocks 1212, 1214, 1216 and 1218 in a similar manner as the method 700 proceeds through decision block 706 and blocks 708, 712, 712, and 714, described above with reference to FIG. 5.

Thus, the embodiments provide for the detection of duplicate packets without using the Spanning Tree Protocol to disable duplicate pathways between nodes. These embodiments will allow a network to fully utilize all of the physical connectivity of the network, and the full bandwidth and resiliency of the network can be realized.

Although illustrative embodiments have been shown and described, a wide range of modification, change and substitution is contemplated in the foregoing disclosure and in some instances, some features of the embodiments may be employed without a corresponding use of other features. For example, although using the CRC 610 has been described above, in other embodiments, the content of fields other than CRC field 510 of the of the packet 600 may be compared to the further information 818 included in columns other than the CRC column 802 in the list 800. Additionally, it is also foreseen that multiple fields of the packet 600 may be compared to the elements 814 and further information 818 in multiple columns. Furthermore, the list 800 may be configured to only contain a fixed amount of rows, and each time a new element is added in a row as an additional element, the oldest row of the list 800 may be deleted. Accordingly, it is appropriate that the appended claims be construed broadly and in a manner consistent with the scope of the embodiments disclosed herein.

What is claimed is:

1. An information handling system (IHS), comprising:
   network hardware for providing a network interface to a network;
   a processor coupled to the network hardware; and
   at least one storage device coupled to the processor, wherein the at least one storage device includes an accepted packet list;
   wherein, in response to receiving a packet that includes a packet error check value and a packet data field through the network interface, the IHS:
     compares the packet error check value to a plurality of error check elements in the accepted packet list;
     wherein, in response to the packet error check value not matching an error check element in the accepted packet list, the packet is accepted;
     wherein, in response to the packet error check value matching an error check element in the accepted packet list, the packet data field is compared to a data element that is associated with the matching error check element in the accepted packet list;
     wherein, in response to the packet data field not matching the data element, the packet is accepted; and
     wherein, in response to the packet data field matching the data element, the packet is discarded.

2. The IHS of claim 1, wherein the IHS is further operable to:
   delete an error check element in the plurality of error check elements from the accepted packet list in response to determining that the error check element has been in the accepted packet list for longer than a selected time interval.

3. The IHS of claim 1, wherein the IHS is further operable, in response to accepting the packet, to:
   delete the matching error check element if the matching error check element is found in the accepted packet list;
   add the packet error check value as an error check element in the accepted packet list; and
   add the packet data field as a data field element in the accepted packet list and associate the data field element from the packet data field with the error check element from the packet error check value.

4. The IHS of claim 1, wherein the packet error check value includes a cyclic redundancy check (CRC) check value.

5. The IHS of claim 4, wherein the plurality of error check elements in the accepted packet list includes a plurality of CRC check values associated with previously accepted packets.

6. The IHS of claim 1, wherein the packet data field includes data being sent in the packet that does not include a destination address, a source address, and a packet type, and wherein the data element in the accepted packet list includes data associated with a previously accepted packet that does not include a destination address, a source address, and a packet type.

7. The IHS of claim 1, wherein the at least one storage device includes an application and an operating system, and wherein the IHS is further operable, in response to the accepting the packet, to:
  pass the packet from the operating system to the application.

8. An information handling system (IHS), comprising:
  network hardware for providing a network interface to a network;
  a processor coupled to the network hardware; and
  at least one storage device coupled to the processor, wherein the at least one storage device includes an accepted packet list;
  wherein, in response to receiving a packet that includes a packet error check value through the network interface, the IHS:
    compares the packet error check value to a plurality of error check elements in the accepted packet list;
    wherein, in response to the packet error check value not matching an error check element in the accepted packet list, the packet is accepted;
    wherein, in response to the packet error check value matching an error check element in the accepted packet list, a time stamp associated with the matching error check value in the accepted packet list is used to determine whether the matching error check value has been in the accepted packet list for longer than a selected time interval;
    wherein, in response to the matching error check value having not been in the accepted packet list for longer than the selected time interval, the packet is discarded; and
    wherein, in response to the matching error check value having been in the accepted packet list for longer than the selected time interval, the packet is accepted.

9. The IHS of claim 8, wherein the IHS is further operable, in response to receiving the packet, to:
  generate a time stamp.

10. The IHS of claim 9, wherein the IHS is further operable, in response to accepting the packet, to:
  delete the matching error check element if the matching error check element is found in the accepted packet list;
  add the packet error check value as an error check element in the accepted packet list; and
  add the time stamp in the accepted packet list and associate the time stamp with the error check element from the packet error check value.

11. The IHS of claim 8, wherein the packet error check value includes a cyclic redundancy check (CRC) check value.

12. The IHS of claim 11, wherein the plurality of error check elements in the accepted packet list includes a plurality of CRC check values associated with previously accepted packets.

13. The IHS of claim 8, wherein the packet includes a packet data field and the IHS is further operable to:
  in response to the packet error check value matching the error check element in the accepted packet list, compare the packet data field to a data element that is associated with the matching error check element in the accepted packet list;
  wherein, in response to the matching error check value having been in the accepted packet list for longer than the selected time interval and the packet data field not matching the data element, the packet is accepted;
  wherein, in response to the matching error check value having been in the accepted packet list for longer than the selected time interval and the packet data field matching the data element, the packet is discarded.

14. The IHS of claim 8, wherein the at least one storage device includes an application and an operating system, and wherein the IHS is further operable, in response to the accepting the packet, to:
  pass the packet from the operating system to the application.

15. An information handling system (IHS) network, comprising:
  a plurality of nodes, each node including:
    a network device for providing a network interface between the node and other nodes; and
    an IHS including a processor coupled to the network device and at least one storage device coupled to the processor, wherein the at least one storage device includes an accepted packet list;
  wherein, in response to receiving a packet that includes a packet error check value from an other node through the network interface, the IHS:
    compares the packet error check value to a plurality of error check elements in the accepted packet list;
    wherein, in response to the packet error check value not matching an error check element in the accepted packet list, the packet is accepted;
    wherein, in response to the packet error check value matching an error check element in the accepted packet list, the packet data is discarded.

16. The IHS network of claim 15, wherein the packet includes a packet data field and the IHS in each node is further operable to:
  in response to the packet error check value matching the error check element in the accepted packet list, compare the packet data field to a data element that is associated with the matching error check element in the accepted packet list;
  wherein, in response to the packet data field not matching the data element, the packet is accepted; and
  wherein, in response to the packet data field matching the data element, the packet is discarded.

17. The IHS network of claim 16, wherein the packet data field includes data being sent in the packet that does not include a destination address, a source address, and a packet type, and wherein the data element in the accepted packet list includes data associated with a previously accepted packet that does not include a destination address, a source address, and a packet type.

18. The IHS network of claim 15, wherein the IHS in each node is further operable to:
  in response to the packet error check value matching the error check element in the accepted packet list, use a time stamp associated with the matching error check value in the accepted packet list to determine whether the matching error check value has been in the accepted packet list for longer than a selected time interval;
  wherein, in response to the matching error check value having not been in the accepted packet list for longer than the selected time interval, the packet is discarded; and wherein, in response to the matching error check value having been in the accepted packet list for longer than the selected time interval, the packet is accepted.

19. The IHS network of claim 15, wherein the IHS in each node is further operable to:
    generate a time stamp in response to receiving the packet; and
    in response to accepting the packet:
        delete the matching error check element if the matching error check element is found in the accepted packet list;
        add the packet error check value as an error check element in the accepted packet list; and
        add the time stamp in the accepted packet list and associate the time stamp with the error check element from the packet error check value.

20. The IHS network of claim 15, wherein the IHS in each node is further operable to:
    delete an error check element in the plurality of error check elements from the accepted packet list in response to determining that the error check element has been in the accepted packet list for longer than a selected time interval.

* * * * *